UNITED STATES PATENT OFFICE.

CARL VON FORELL, OF HAMBURG, GERMANY, ASSIGNOR TO HENRY EDMUNDS, OF LONDON, ENGLAND.

PROCESS OF MANUFACTURING PORTLAND CEMENT FROM SLAG.

No. 795,275.   Specification of Letters Patent.   Patented July 25, 1905.

Application filed December 29, 1903. Serial No. 186,935.

*To all whom it may concern:*

Be it known that I, CARL VON FORELL, a citizen of Germany, residing at Hamburg, Germany, have invented new and useful Improvements in Processes for the Manufacture of Portland Cement from Slag, of which the following is a specification.

The production of Portland cement is well known according to the method of burning water-granulated blast-furnace slag having a lime content of fifty per cent. in a kiln to the clinkering-point, thereupon cooling it, and finally grinding it. I have found, however, that a good cement of the useful qualities of Portland cement may be obtained from such blast-furnace slag if the water-granulated basic slag, which may be mixed with usine-meal (slag-meal) and may be pressed into stones, is burned with an oxidizing-flame and is then subjected to a sudden dry cooling, while for the purpose of oxidation just before cooling small quantities of water may be added to the basic slag. By these means the slag obtains a greater brittleness and crispness, by reason of which characteristics the slag may be more readily ground. Furthermore, in this manner the process of production is shortened, and it also results that air, carbonic acid, or moisture cannot decompose the cement into silica and lime, the hydraulic qualities of the cement, therefore, being better retained in consequence of the sudden cooling than with a slow cooling or a granulation in water.

According to later experiments the principal chemical factor in the setting of the cement is the combination of silicic acid and lime, so that when by reason of the access of air, carbonic acid, and moisture the lime separates the conditions for the commencement of such chemical combination are disturbed and the hydraulic qualities of the cement are lessened.

In carrying out the new process it is advisable to proceed as follows: The burning of the slag should in order to obtain a uniform mixture take place in a rotary kiln from which the mass burned with an oxidizing-flame and issuing at the highest heat of the kiln is disintegrated as thoroughly as possible and thrown as rapidly as possible against intensely-cooled dry surfaces. It is essential that the sudden cooling process and chilling follow at once and immediately after the burning process.

The result of the sudden cooling is that the hydraulic factors—lime, silica, and clay combinations—which are developed by the high temperature retain their full energy and do not suffer a shifting of the molecules by taking up oxygen, carbonic acid, or moisture, nor does a disassociation of the combination which took place in the fire result, so that the chilled material only requires to be ground in order to form a finished cement.

What I claim is—

1. The process of producing cement from furnace-slag which consists in forming briquets from a mixture of water-granulated furnace-slag and slag-meal, in roasting said briquets in a rotary kiln in an oxidizing-flame, in adding to said highly-heated slag small quantities of water, in disintegrating and projecting said heated slag against chilled surfaces, and in grinding said treated slag material.

2. The process of producing cement from furnace-slag which consists in forming briquets from furnace-slag, in roasting said briquets, in treating said heated slag with small quantities of water, in disintegrating and projecting said heated slag into contact with cooling means and in grinding said treated slag.

3. The process of producing cement from furnace-slag which consists in forming briquets of furnace-slag, in burning said briquets, in disintegrating and projecting said heated slag into contact with cooling means, and in grinding said treated slag.

4. The process of producing cement from furnace-slag which consists in burning water-granulated slag in a rotary kiln in an oxidizing-flame and in disintegrating and projecting said heated slag into contact with cooling means.

Signed by me at Hamburg this 18th day of December, 1903.

CARL VON FORELL.

Witnesses:
 F. POTHS,
 J. CHRIST. HAFERMANN.